US012646109B2

(12) United States Patent
Leonard-Albrecht

(10) Patent No.: US 12,646,109 B2
(45) Date of Patent: Jun. 2, 2026

(54) SYSTEMS AND METHODS FOR GENERATING IMPROVED GRAPHICAL USER INTERFACES DISPLAYING ACCOUNT INFORMATION

(71) Applicant: Wells Fargo Bank, N.A., San Francisco, CA (US)

(72) Inventor: Karen Leonard-Albrecht, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/664,127

(22) Filed: May 14, 2024

(65) Prior Publication Data

US 2025/0356413 A1     Nov. 20, 2025

(51) Int. Cl.
*G06Q 40/02* (2023.01)
*G06F 9/451* (2018.01)

(52) U.S. Cl.
CPC ............. *G06Q 40/02* (2013.01); *G06F 9/451* (2018.02)

(58) Field of Classification Search
CPC ................................ G06Q 40/02; G06F 9/451
See application file for complete search history.

(56) References Cited

U.S. PATENT DOCUMENTS

| | | | |
|---|---|---|---|
| 8,311,513 B1 | 11/2012 | Nasserbakht | |
| 10,169,812 B1 | 1/2019 | Bajgier et al. | |
| 11,538,025 B1 * | 12/2022 | Kitsis | G06Q 20/36 |
| 11,847,623 B1 * | 12/2023 | Bowers | G06Q 20/405 |
| 11,868,978 B1 * | 1/2024 | Bowers | G06Q 20/3223 |
| 12,293,351 B2 * | 5/2025 | Duane | G06Q 20/1235 |
| 2012/0324507 A1 | 12/2012 | Weber | |
| 2017/0061530 A1 * | 3/2017 | Kennedy | G06Q 40/02 |
| 2020/0004884 A1 * | 1/2020 | Gibson | G06F 16/9535 |
| 2021/0209696 A1 | 7/2021 | Sayed | |
| 2022/0020085 A1 | 1/2022 | Degrazia | |

FOREIGN PATENT DOCUMENTS

WO     WO-2020028513 A1 *     2/2020     ............. G06F 16/27

OTHER PUBLICATIONS

SnapComms an Everybridge Company. "Desktop Ticker", Nov. 22, 2023, snapcomms.com.

* cited by examiner

*Primary Examiner* — Elda G Milef
(74) *Attorney, Agent, or Firm* — Foley & Lardner LLP

(57)     ABSTRACT

Systems and methods are described herein for generating improved graphical user interfaces for displaying account information. Such systems and methods may use a provider computing system to identify one or more accounts associated with a user. The provider computing system may retrieve account information for each of the one or more accounts including an account balance, a scheduled transaction, or a predicted transaction. The provider computing system may monitor the account information for real-time updates. The provider computing system may cause a user interface to be displayed as an overlay on a user device including one or more selectable elements indicative of at least one of the account balance, the scheduled transaction, or the predicted transaction, and including one or more of the real-time updates. Each selectable element is configured to cause, when selected, the user interface to display additional information relating to an account associated with the selectable element.

19 Claims, 9 Drawing Sheets

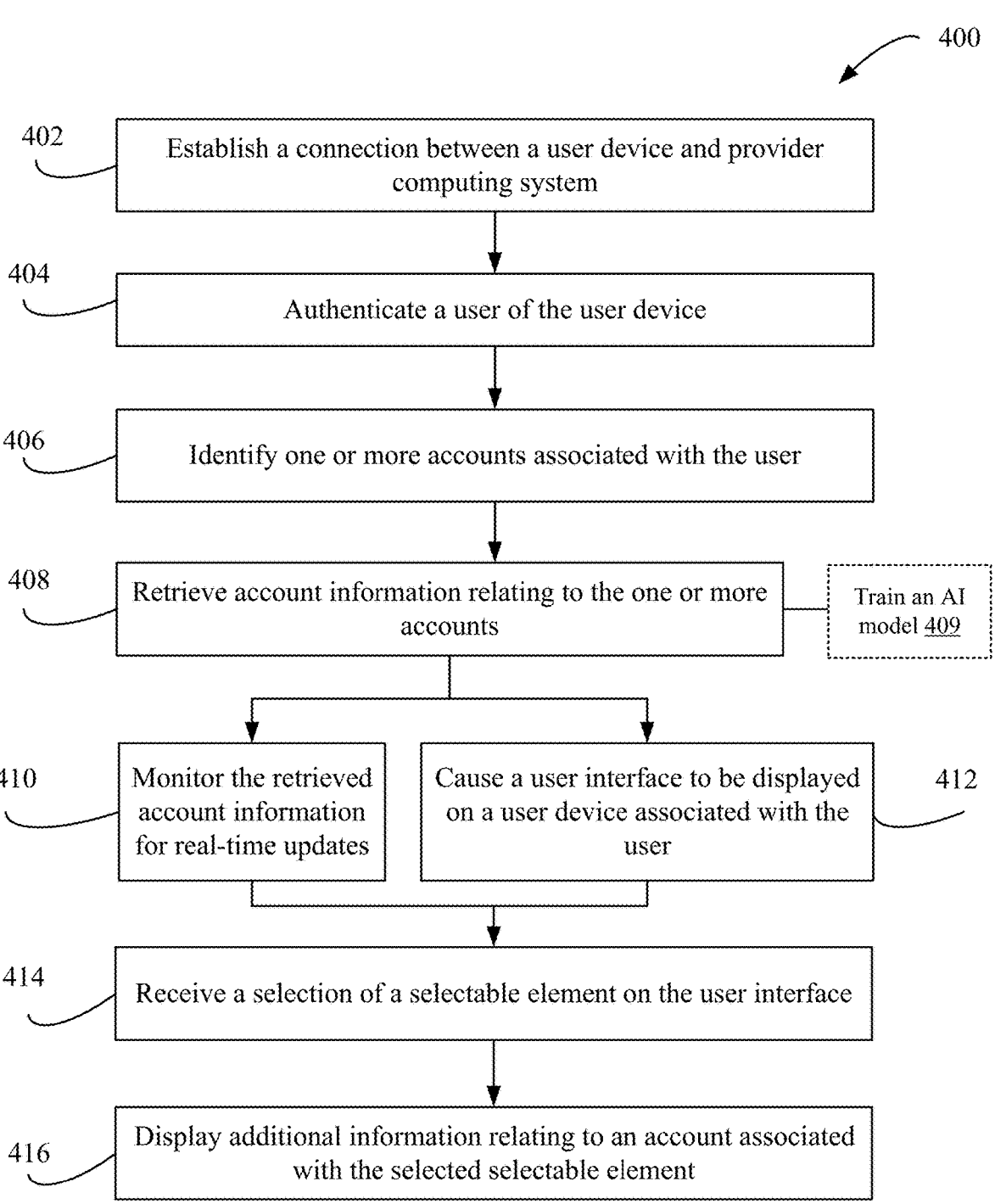

400

402  Establish a connection between a user device and provider computing system

404  Authenticate a user of the user device

406  Identify one or more accounts associated with the user

408  Retrieve account information relating to the one or more accounts

Train an AI model 409

410  Monitor the retrieved account information for real-time updates

412  Cause a user interface to be displayed on a user device associated with the user 414  Receive a selection of a selectable element on the user interface 416  Display additional information relating to an account associated with the selected selectable element

...tion 6 - - - Acct. 1 Balance: $34,340.55;  Transaction 1;  Transaction 2;  Transaction 3 - - - Acct. 2 Balance: €7,23...

START

11:32:52 AM
4/4/2024

SYSTEMS AND METHODS FOR GENERATING IMPROVED GRAPHICAL USER INTERFACES DISPLAYING ACCOUNT INFORMATION

TECHNICAL FIELD

The present disclosure relates to systems and methods for generating improved graphical user interfaces (GUIs) that display account information. More specifically, the present disclosure relates to displaying relevant data from multiple accounts associated with a user on a single GUI.

BACKGROUND

Users associated with a plurality of accounts (e.g., controllers responsible for managing a plurality of financial accounts associated with a company) are often required to pass a plurality of distinct authentication measures in order to access each of the plurality accounts, and typically have to navigate a plurality of user interfaces in order to view the most relevant information (e.g., time sensitive transactions, high risk balance amounts, fraud indicators, etc.) from each of the plurality of accounts, particularly if the plurality of accounts are held across multiple providers (e.g., accounts held across multiple banks). These various authentication measures and numerous user interfaces can pose challenges to keeping account information organized and to efficiently manage multiple accounts, such as when monitoring real-time balances across a plurality of accounts.

SUMMARY

An embodiment relates to a provider computing system. The provider computing system includes a processing circuit having a processor coupled to a memory device. The memory device stores instructions thereon that, when executed by the processor, cause the processing circuit to perform operations including: identifying one or more accounts associated with a user; retrieving account information for each of the one or more accounts, where the account information comprises at least one of an account balance, a scheduled transaction, or a predicted transaction; monitoring the account information for real-time updates to the at least one of the account balance, the scheduled transaction, or the predicted transaction; and causing a user interface to be displayed on a user device associated with the user, the user interface comprising one or more selectable elements indicative of at least one of the account balance, the scheduled transaction, or the predicted transaction, and comprising one or more of the real-time updates, where each selectable element is configured to cause, when selected, the user interface to display additional information relating to an account of the one or more accounts associated with the selectable element.

Another embodiment relates to a method. The method includes: identifying, by a provider computing system, one or more accounts associated with a user; retrieving, by the provider computing system, account information for each of the one or more accounts, where the account information comprises at least one of an account balance, a scheduled transaction, or a predicted transaction; monitoring, by the provider computing system, the account information for real-time updates to the at least one of the account balance, the scheduled transaction, or the predicted transaction; and causing, by the provider computing system, a user interface to be displayed on a user device associated with the user, the user interface comprising one or more selectable elements indicative of at least one of the account balance, the scheduled transaction, or the predicted transaction, and comprising one or more of the real-time updates, where each selectable element is configured to cause, when selected, the user interface to display additional information relating to an account of the one or more accounts associated with the selectable element.

Another embodiment relates to a non-transitory computer-readable medium storing instructions that, when executed by one or more processors of a processing circuit, cause the processing circuit to identify one or more accounts associated with a user; retrieve account information for each of the one or more accounts, where the account information comprises at least one of an account balance, a scheduled transaction, or a predicted transaction; monitor the account information for real-time updates to the at least one of the account balance, the scheduled transaction, or the predicted transaction; and cause a user interface to be displayed on a user device associated with the user, the user interface comprising one or more selectable elements indicative of at least one of the account balance, the scheduled transaction, or the predicted transaction, and comprising one or more of the real-time updates, where each selectable element is configured to cause, when selected, the user interface to display additional information relating to an account of the one or more accounts associated with the selectable element.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 depicts a method of generating improved GUIs displaying account information, according to an example embodiment.

DETAILED DESCRIPTION

Figure 1:
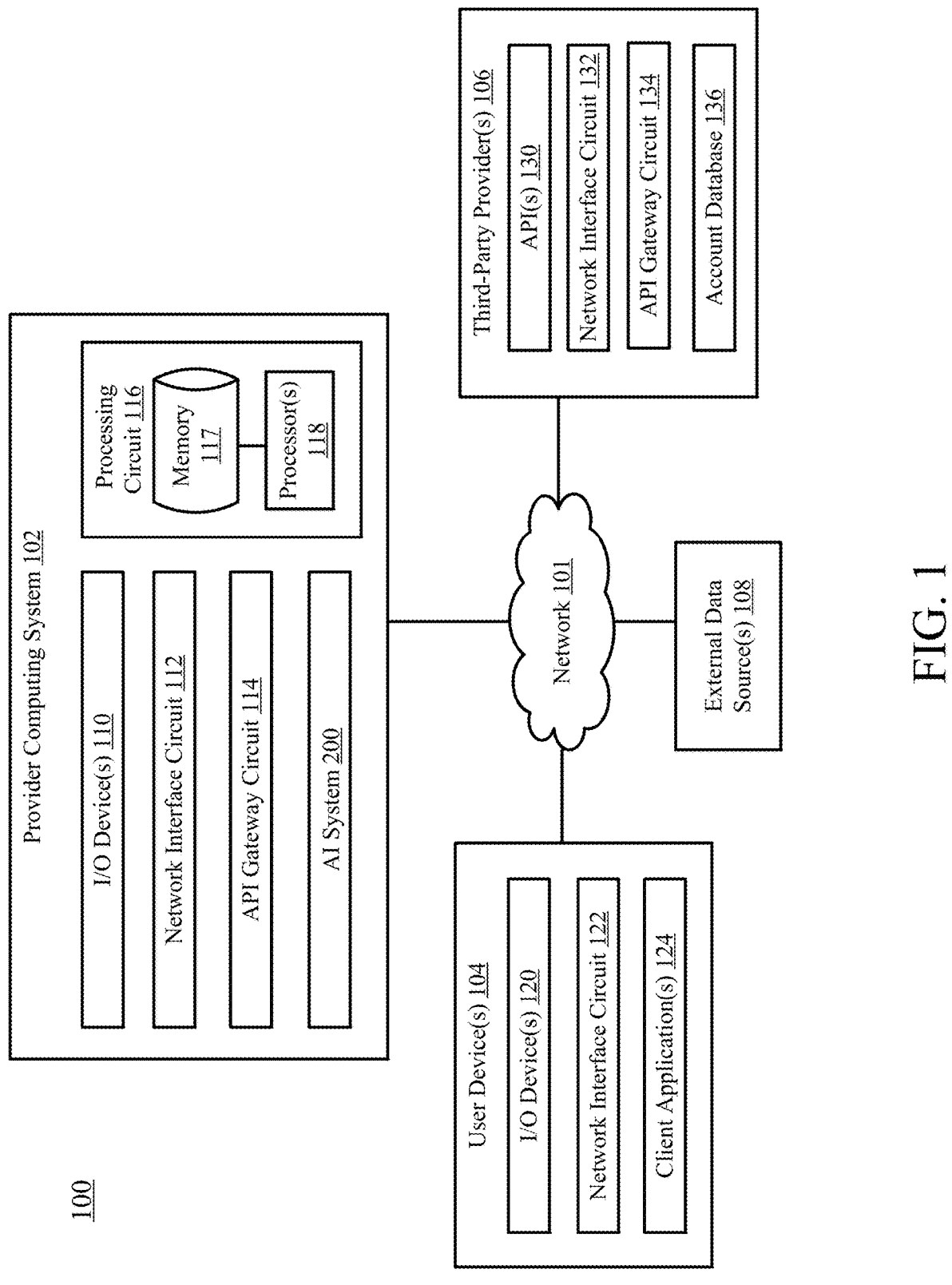
FIG. 1 depicts a block diagram of a system for generating improved graphical user interfaces (GUIs) displaying account information, according to an example embodiment.

Referring generally to the figures, systems and methods for generating improved graphical user interfaces (GUIs) displaying account information are disclosed. For example, systems and methods described herein allow for users to view information (e.g., time-sensitive transactions, high currency transactions, high-risk transactions, real-time account balances, etc.) across a plurality of accounts from a single GUI. That is, the systems and methods described herein prevent users from having to navigate through a plurality of authentication measures and user interfaces in order to view information for each of the various accounts.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The implementations described herein address the technical problem by providing enhanced data integration and analysis capabilities, which deliver a particular technical solution that streamlines and refines displays of account information from multiple sources. The systems and methods described herein are implemented to improve how data is synthesized and utilized from various accounts of a user. By integrating data related to a plurality of accounts associated with a user, these systems and methods provide dynamic displays that be automatically rearranged and adapt to changes in user activities and in predicted activity. For example, the implementations can provide continuous re-evaluations of predicted activity as transactions occur across various accounts of clients, subsidiaries, and other related entities. Accordingly, this approach provides a specific technical improvement to various technical problems, including those set forth herein.

The improved graphical user interfaces can facilitate the management of multiple accounts associated with a user, leveraging data analytics to proactively monitor transactions and account balances. By applying machine learning models, the systems and methods can detect patterns and predict outcomes based on a large amount of data inputs, such as transaction histories and third-party data. This can improve displays of account information such that models are not only based on scheduled transactions but are continuously updated, trained, and provided to a user to proactively and effectively monitor a plurality of accounts. Accordingly, the models trained and implemented herein provide technological improvements over existing business ecosystems by providing real-time, adaptive response mechanisms that tailor operational strategies based on current data insights. That is, these improvements are realized by implementing real-time data integration and dynamic interpretation, enhancing both the speed and accuracy of operational responses. For example, lack of real-time data integration is a technical problem in existing technological ecosystems, which is solved by implementing adaptive machine learning models, a technical solution.

In some arrangements, the systems and methods can act as intermediaries that assess real-time transactions to monitor for abnormal and high-risk activity. For example, if a scheduled transaction with a receiving party is projected to result in a negative account balance, the systems and methods can immediately identify the scheduled transaction and display the high-risk transaction prominently among a plurality of transactions across multiple accounts associated with the user. These models can identify vulnerabilities and security issues in transactions across multiple accounts and can also be configured to display the information from multiple accounts on a single user interface to provider operational efficiency for a controller/manager/owner of the multiple accounts. By analyzing transactional and third-party data, such as credit ratings and market conditions, the systems and methods can generate recommendations for strategic adjustments before or after transactions occur.

FIG. 1 is a diagram of a system 100 for generating improved graphical user interfaces (GUIs) displaying account information, according to an example embodiment. As shown, the system 100 includes a provider computing system 102 communicably coupled to one or more user device(s) 104, one or more third-party provider(s) 106, and one or more external data source(s) 108. The provider computing system 102 is owned by, associated with, or otherwise operated by a provider (e.g., a service provider, a bank, or other financial institution). The provider may maintain one or more accounts held by various customers, such as demand deposit accounts, credit card accounts, receivables accounts, and so on. Similarly, the one or more third-party provider(s) 106 may be owned by, associated with, or otherwise operated by a provider (e.g., a service provider, a bank, or other financial institution) that maintains one or more accounts held by various customers. The provider computing system 102, the one or more user device(s) 104, the one or more third-party provider(s) 106, and the one or more external data source(s) 108 are in communication with each other and are connected by a network 101.

The network 101 can include any type or form of one or more networks. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks. The network 101 can be of any such network topology as known to those ordinarily skilled in the art capable of supporting the operations described herein. The network 101 can utilize different techniques and layers or stacks of protocols, including, e.g., the Ethernet protocol, the Internet protocol suite (TCP/IP), the Asynchronous Transfer Mode technique, the SONET (Synchronous Optical Networking) protocol, or the SD (Synchronous Digital Hierarchy) protocol. The TCP/IP Internet protocol suite can include application layer, transport layer, Internet layer (including, e.g., IPv6), or the link layer. The network 101 can include a type of a broadcast network, a telecommunications network, a data communication network, or a computer network.

In some instances, the provider computing system 102 may be embodied by one or more servers, each with one or more processing circuits (e.g., processing circuit 116) having one or more processors (e.g., processor(s) 118) configured to execute instructions stored in one or more memory devices (e.g., memory 117) to send and receive data stored in the one or more memory devices and perform other operations to implement the methods described herein associated with logic or processes shown in the figures. In some instances, the provider computing system 102 may include and/or have various other devices communicably coupled thereto, such as, for example, desktop or laptop computers (e.g., tablet computers), smartphones, wearable devices (e.g., smartwatches), and/or other suitable devices.

In some embodiments, the provider computing system 102 includes one or more I/O devices 110, a network interface circuit 112, an API gateway circuit 114, a processing circuit 116, and an AI system 200. The processing circuit 116 may include a memory 117 and one or more processor(s) 118. The one or more I/O devices 110 are configured to receive inputs from and display information to a user. While the term "I/O" is used, it should be understood that the I/O devices 110 may be input-only devices, output-only devices, and/or a combination of input and output devices.

In some instances, the network interface circuit 112 includes, for example, program logic that connects the provider computing system 102 to the network 101. For example, in some instances, the program logic interfaces with one or more transceivers (e.g., Bluetooth, Wi-Fi, or any other suitable communication transceivers) to enable connection with the network 101. The network interface circuit 112 facilitates secure communications between the provider computing system 102, each of the user device(s) 104, each of the third-party provider(s) 106, and each of the external data source(s) 108. The network interface circuit 112 also facilitates communication with other entities, such as other banks or financial institutions, settlement systems, and so on. The network interface circuit 112 further includes user interface program logic configured to generate and present web pages to users accessing the provider computing system 102 over the network 101.

In some embodiments, the provider computing system 102 includes the API gateway circuit 114. In some embodiments, external devices (e.g., the user device(s) 104, the third-party provider(s) 106, and/or the external data source (s) 108, etc.) may include and/or execute API protocols that are used to establish an API session between the provider computing system 102 and the external devices. In this regard, the API protocols and/or sessions may allow the provider computing system 102 to communicate content and data (e.g., one or more services offered by the provider computing system 102) to be displayed/provided/rendered directly within the external devices. For example, the external device may activate an API protocol (e.g., via an API call), which may be communicated to the provider computing system 102 via the network 101 and the network interface circuit 112. The API gateway circuit 114 may receive the API call from the network interface circuit 112, and the API gateway circuit 114 may process and respond to the API call by providing API response data. The API response data may be communicated by the provider computing system 102 to the external device via the network interface circuit 112 and the network 101. The external device may then access (e.g., display/use/interface with) the API response data (e.g., one or more services offered by the provider institution) on the external device.

As such, the API gateway circuit 114 is structured to initiate, receive, process, and/or respond to API calls (e.g., via the network interface circuit 112) over the network 101. That is, the API gateway circuit 114 may be configured to facilitate the communication and exchange of content and data between the external devices and the provider computing system 102. Accordingly, to process various API calls, the API gateway circuit 114 may receive, process, and respond to API calls using other circuits. Additionally, the API gateway circuit 114 may be structured to receive communications (e.g., API calls, API response data, etc.) from other circuits. That is, other circuits may communicate content and data to the provider computing system 102 via the API gateway circuit 114. Therefore, the API gateway circuit 114 is communicatively coupled to other circuits of the provider computing system 102, either tangibly via hardware, or indirectly via software.

The provider computing system 102 is shown to include the processing circuit 116, including memory 117 and processor(s) 118. The processing circuit 116 may be structured or configured to execute or implement the instructions, commands, and/or control processes described herein with respect to the memory 117 and/or the processor(s) 118.

The memory 117 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 117 may be or include tangible, non-transient volatile memory or non-volatile memory. The memory 117 may also include database components, object code components, script components, or any other type of information structure for supporting the activities and information structures described in the present application.

In some embodiments, the memory 117 may include an account database. The account database is structured or configured to retrievably store customer account information associated with various customer accounts held or otherwise maintained by the provider institution on behalf of its customers. In some instances, the customer account information includes both customer information and account information pertaining to a given customer account. For example, in some instances, the customer information may include a name, a phone number, an e-mail address, a physical address, an occupation, etc. of the customer associated with the customer account. In some instances, the account information may include transaction information, information pertaining to the type and corresponding capabilities of the given account, a transfer service token (e.g., a phone number, an e-mail address, or a tag associated with a particular transfer service account) associated with the customer account, etc. of the customer account.

The processing circuit 116 is also shown to include processor(s) 118. The processor(s) 118 may be implemented or performed with a general-purpose single- or multi-chip processor, a digital signal processor (DSP), an application specific integrated circuit (ASIC), one or more field programmable gate arrays (FPGAs), or other suitable electronic processing components. A general-purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the processors 118 may be shared by multiple circuits (e.g., the circuits of the processor(s) 118 may comprise or otherwise share the same processor which, in some example embodiments, may execute instructions stored, or otherwise accessed, via different areas of the memory 117). Alternatively or additionally, the processor(s) 118 may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

In some embodiments, the provider computing system 102 includes the AI system 200, as described below with reference to FIGS. 2 and 3. Alternatively, the AI system 200 may be remote to the provider computing system 102. For example, in some embodiments, the AI system 200 is separate from the provider computing system 102, and may communicate with the provider computing system 102 via one or more networks, such as the network 101. The AI system 200 may be configured to receive internal data stored by the provider computing system 102 (e.g., from the memory 117). The provider computing system 102 may also be configured to retrieve data from the external data source (s) 108 to provide to the AI system 200 (e.g., as training inputs 202, as actual outputs 210, etc.). In some embodiments, the AI system 200 receives inputs from the user device(s) 104 via the provider computing system 102 (e.g., received by the network interface circuit 112). The AI system 200 may also receive inputs from the third-party provider(s) 106 via the provider computing system 102 (e.g., received by the network interface circuit 112).

The user device 104 is owned, operated, controlled, managed, and/or otherwise associated with a user, such as an employee of the provider (e.g., a banker, analyst, or other employee that works on managing financial accounts), a client/customer of the provider (e.g., a person associated with an entity having one or more accounts with the provider), or a third party. In some embodiments, the user device 104 may be or may include, for example, a desktop or laptop computer (e.g., a tablet computer), a smartphone, a wearable device (e.g., a smartwatch), a personal digital assistant, and/or any other suitable computing device.

In some embodiments, the user device 104 includes one or more I/O devices 120, a network interface circuit 122, and one or more client applications 124. While the term "I/O" is used, it should be understood that the I/O devices 120 may be input-only devices, output-only devices, and/or a combination of input and output devices.

In some instances, the I/O devices 120 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the user to provide inputs (such as a touchscreen display, stylus, keyboard, force sensor for sensing pressure on a display screen, etc.). In some instances, the I/O devices 120 further include one or more user interfaces (devices or components that interface with the user), which may include one or more biometric sensors (such as a fingerprint reader, a face scanner, an iris scanner, etc.).

The network interface circuit 122 includes, for example, program logic and various devices (e.g., transceivers, etc.) that connect the user device 104 to the network 101. For example, in some instances, the program logic interfaces with one or more transceivers (e.g., Bluetooth, Wi-Fi, or any other suitable communication transceivers) to enable connection with the network 101. The network interface circuit 122 facilitates secure communications between the user device 104 and the provider computing system 102. The network interface circuit 122 also facilitates communication with other entities, such as other banks, settlement systems, and so on (e.g., the third-party provider(s) 106, the external data source(s) 108, etc.).

In some embodiments, the user device 104 stores in computer memory, and executes ("runs") using one or more processors, various client applications 124, such as an Internet browser presenting websites, text messaging applications, and/or applications provided or authorized by entities implementing or administering any of the computing systems in the system 100.

For example, in some instances, the client applications 124 include a provider client application (e.g., a financial institution banking application) provided by and at least partly supported by the provider computing system 102. For example, in some instances, the client application 124 coupled to the provider computing system 102 enables the user to perform various activities associated with a transaction.

The system 100 is further shown to include one or more third-party provider(s) 106. The third-party provider(s) 106 may include one or more institutions (e.g., financial institutions) where a user has one or more accounts. The third-party provider(s) 106 may include one or more API(s) 130, a network interface circuit 132, an API gateway circuit 134, and an account database 136.

In some embodiments, the third-party provider(s) 106 may include the one or more API(s) 130 communicably coupled to/managed by/or otherwise associated with the third-party provider(s) 106. In some embodiments, the one or more API(s) 130 may be an API associated with one or more programs, services, applications, etc., offered by the third-party provider(s) 106 to one or more users enrolled in such corresponding one or more programs, services, applications, etc.

The third-party provider(s) 106 may include the network interface circuit 132, which may be similar/identical to the network interface circuit 112 of the provider computing system 102 and/or to the network interface circuit 122 of the user device 104, as described above. For example, the network interface circuit 132 includes program logic and various devices (e.g., transceivers, etc.) that connect the third-party provider(s) 106 to the network 101. In some instances, the program logic interfaces with one or more transceivers (e.g., Bluetooth, Wi-Fi, or any other suitable communication transceivers) to enable connection with the network 101. The network interface circuit 132 facilitates secure communications between the third-party provider(s) 106 and the provider computing system 102. The network interface circuit 132 also facilitates communication with other entities, such as other banks, settlement systems, and so on (e.g., the provider computing system 102, the external data source(s) 108, etc.).

The third-party provider(s) 106 may include the API gateway circuit 134, which may be similar/identical to the API gateway circuit 114 of the provider computing system 102, as described above. For example, the third-party provider(s) 106 may activate the API protocol, which may be communicated to the provider computing system 102 via the network 101 and the network interface circuits 112/132.

In some embodiments, the third-party provider(s) 106 may include the account database 136. The account database 136 is structured or configured to retrievably store customer account information associated with various customer accounts held or otherwise maintained by the third-party provider 106 on behalf of its customers. In some instances, the customer account information includes both customer information and account information pertaining to a given customer account. For example, in some instances, the customer information may include a name, a phone number, an e-mail address, a physical address, an occupation, etc. of the customer associated with the customer account. In some instances, the account information may include transaction information, information pertaining to the type and corresponding capabilities of the given account, a transfer service token (e.g., a phone number, an e-mail address, or a tag associated with a particular transfer service account) associated with the customer account, etc. of the customer account.

The provider computing system 102 may be communicably coupled to the external data source(s) 108. The external data source(s) 108 can provide data to the provider computing system 102, the user device(s) 104, and/or the third-party provider(s) 106. In some arrangements, the external data source(s) 108 can be structured to collect data from other devices connected via the network 101 (e.g., the user device(s) 104 and/or third-party providers(s) 106) and relay the collected data to the provider computing system 102 and/or user device 104.

Figure 2:
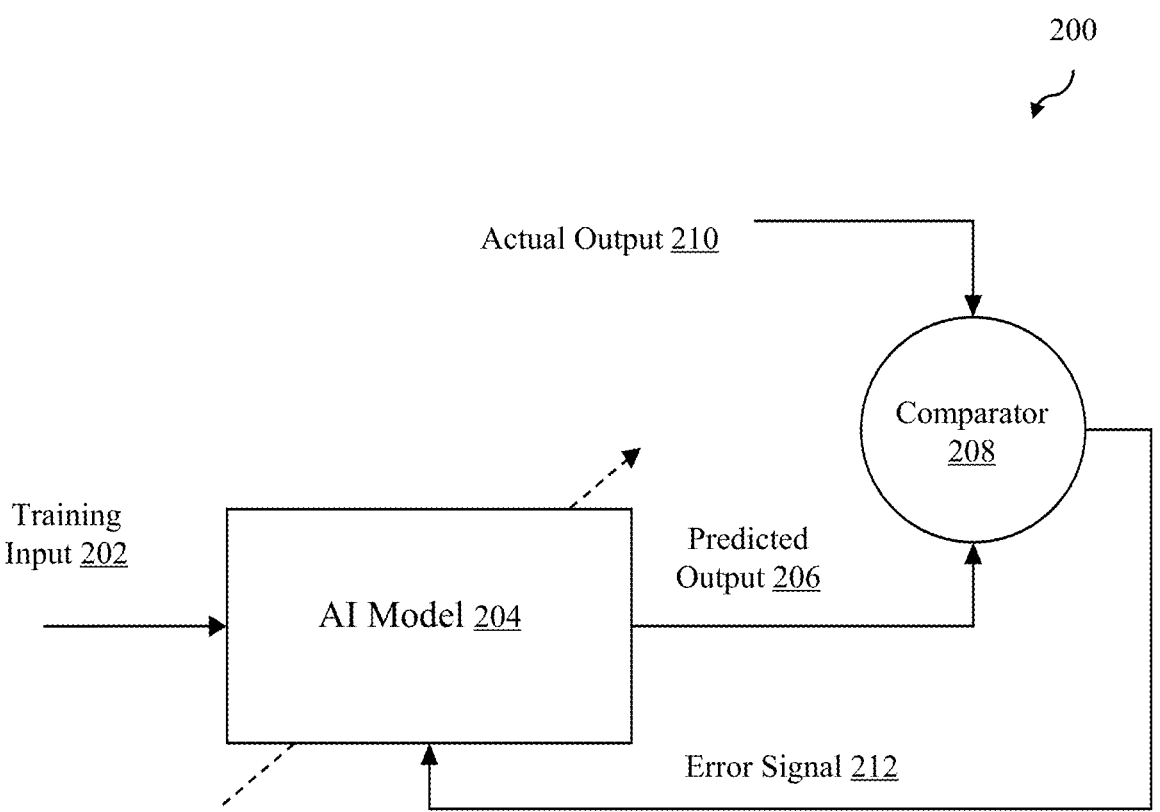
FIG. 2 depicts a block diagram of an AI sub-system of the system of FIG. 1, according to an example embodiment.

Referring to FIG. 2, a block diagram of the AI system 200 is shown. The AI system 200 may include at least one AI model 204. In some embodiments, AI system 200 employs one or more of supervised learning, unsupervised learning, semi-supervised learning, reinforcement learning, self-supervised learning, transfer learning, deep learning, ensemble learning, instance-based learning, decision tree learning, batch learning, or online learning to train the AI model 204.

In some embodiments, AI system 200 employs supervised learning, which is a method of training a machine learning model (e.g., the AI model 204) given input-output pairs, where an input-output pair is an input with an associated known output (e.g., an expected output). In some embodiments, the AI system 200 employs unsupervised learning, which is a method of training a machine learning model (e.g., the AI model 204) where the model is presented with unlabeled data and must identify patterns or structures within it using techniques such as clustering or dimensionality reduction. In some embodiments, the AI system 200 employs semi-supervised learning, which is a method of training a machine learning model (e.g., the AI model 204) using a combination of supervised and unsupervised learning where the model is trained on a dataset with both labeled and unlabeled examples. In some embodiments, the AI system 200 employs reinforcement learning, a method of training a machine learning model (e.g., the AI model 204) where an agent interacts with data and receives feedback in the form of rewards or penalties and the agent learns to take actions that maximize cumulative rewards over time. In some embodiments, the AI system 200 employs self-supervised learning, which is a method of training a machine learning model (e.g., the AI model 204) where the model generates its own labels from the input data. In some embodiments, the AI system 200 employs transfer learning, which is a method of training a machine learning model (e.g., the AI model 204) which involves training a model on one task and then leveraging the learned features for a different but related task. In some embodiments, the AI system 200 employs deep learning, which is a method of training a machine learning model (e.g., the AI model 204) involving neural networks with multiple layers. In some embodiments, the AI system 200 employs ensemble learning, which is a method of training a machine learning model (e.g., the AI model 204) which involves combining multiple models to improve overall performance and robustness, commonly using techniques such as bagging (e.g., Random Forests) and boosting (e.g., AdaBoost). In some embodiments, the AI system 200 employs instance-based learning, which is a method of training a machine learning model (e.g., the AI model 204) which involves making predictions based on similarities between new instances and instances in the training dataset, commonly using k-Nearest Neighbors (k-NN) algorithms. In some embodiments, the AI system 200 employs decision tree learning, which is a method of training a machine learning model (e.g., the AI model 204) which involves using a tree-like model of decisions and their possible consequences, where each node in the tree represents a decision based on input features. In some embodiments, the AI system 200 employs batch learning, which is a method of training a machine learning model (e.g., the AI model 204) where the model is trained on the entire dataset at once. In some embodiments, the AI system 200 employs online learning, which is a method of training a machine learning model (e.g., the AI model 204) where the model is updated continuously as new data arrives, allowing for real-time adaptation.

The AI model 204 may be trained based on general data and/or granular data (e.g., data based on a specific user) such that the AI 204 may be trained specific to a particular user (e.g., a user with a customer account at the provider institution). In some instances, the granular data refers to at least one of data from an internal data source (e.g., the memory 117) or external data source(s) (e.g., the third-party provider (s) 106 and/or the external data source(s) 108).

The training inputs 202 and the actual outputs 210 may be provided to the AI model 204 as a training dataset. The training dataset refers to data used to train the AI model 204 to generate predicted transactions. The training inputs 202 may include a transaction history associated with the one or more accounts associated with the particular user, a transaction history associated with one or more accounts associated with other users, contextual information associated with the one or more accounts associated with the user, and or third-party data.

The training inputs 202 and the actual outputs 210 may be received from one or more data sources of the system 100. The one or more data sources may include one or more internal data sources (e.g., the memory 117) and/or one or more external data sources (e.g., the user device(s) 104, the account database 136, the external data source(s) 108, etc.). The one or more internal data sources may be accessible within the provider computing system 102. The one or more external data sources may be accessible over the network 101. For example, the one or more internal data sources may provide account information associated with a user, a transaction history, parameters relating to transactions included in the transaction history (e.g., a timestamp, a transaction type, a transaction amount, or one or more parties associated with the transaction, etc.), and so on. The one or more external data sources may provide account information (e.g., stored in the account database 136), contextual information (e.g., retrieved from the third-party data sources), and so on. Thus, the AI model 204 may be trained to predict one or more transactions based on the training inputs 202 and the actual outputs 210 used to train the AI model 204.

In some embodiments, the AI model 204 may be trained to make one or more recommendations to the user based on current user data received from at least one of the processing circuit 116, the memory 117, the user device(s) 104, and the third-party provider(s) 106. That is, the AI model 204 may be trained using the training inputs 202, such as the transaction history associated with the one or more accounts associated with the user, to predict outputs 206, such as one or more predicted transactions, by applying the current state of the AI model 204 to the training inputs 202. The comparator 208 may compare the predicted outputs 206 to actual outputs 210 (e.g., one or more previous transactions) to determine an amount of error or differences. The actual outputs 210 may be determined based on historic data associated with the recommendation to the user (e.g., data indicating whether the predicted transaction previously recommended to the user was performed or not).

During training, the error (represented by error signal 212) determined by the comparator 208 may be used to adjust the weights in the AI model 204 such that the AI model 204 changes (or learns) over time. The AI model 204 may be trained using a backpropagation algorithm, for instance. The backpropagation algorithm operates by propagating the error signal 212. The error signal 212 may be calculated each iteration, batch and/or epoch, and propagated through the algorithmic weights in the AI model 204 such that the algorithmic weights adapt based on the amount of error. The error is minimized using a loss function. Non-limiting examples of loss functions may include the square error function, the root mean square error function, and/or the cross-entropy error function.

The weighting coefficients of the AI model 204 may be tuned to reduce the amount of error, thereby minimizing the differences between (or otherwise converging) the predicted output 206 and the actual output 210. The AI model 204 may be trained until the error determined at the comparator 208 is within a certain threshold (or a threshold number of batches, epochs, or iterations have been reached). The trained AI model 204 and associated weighting coefficients may subsequently be stored in a memory device or other data repository (e.g., a database) such that the AI model 204 may be employed on unknown data (e.g., not training inputs 202). Once trained and validated, the AI model 204 may be employed during a testing (or an inference phase). During testing, the AI model 204 may ingest unknown data to predict future data (e.g., unprecedented transactions).

Figure 3:
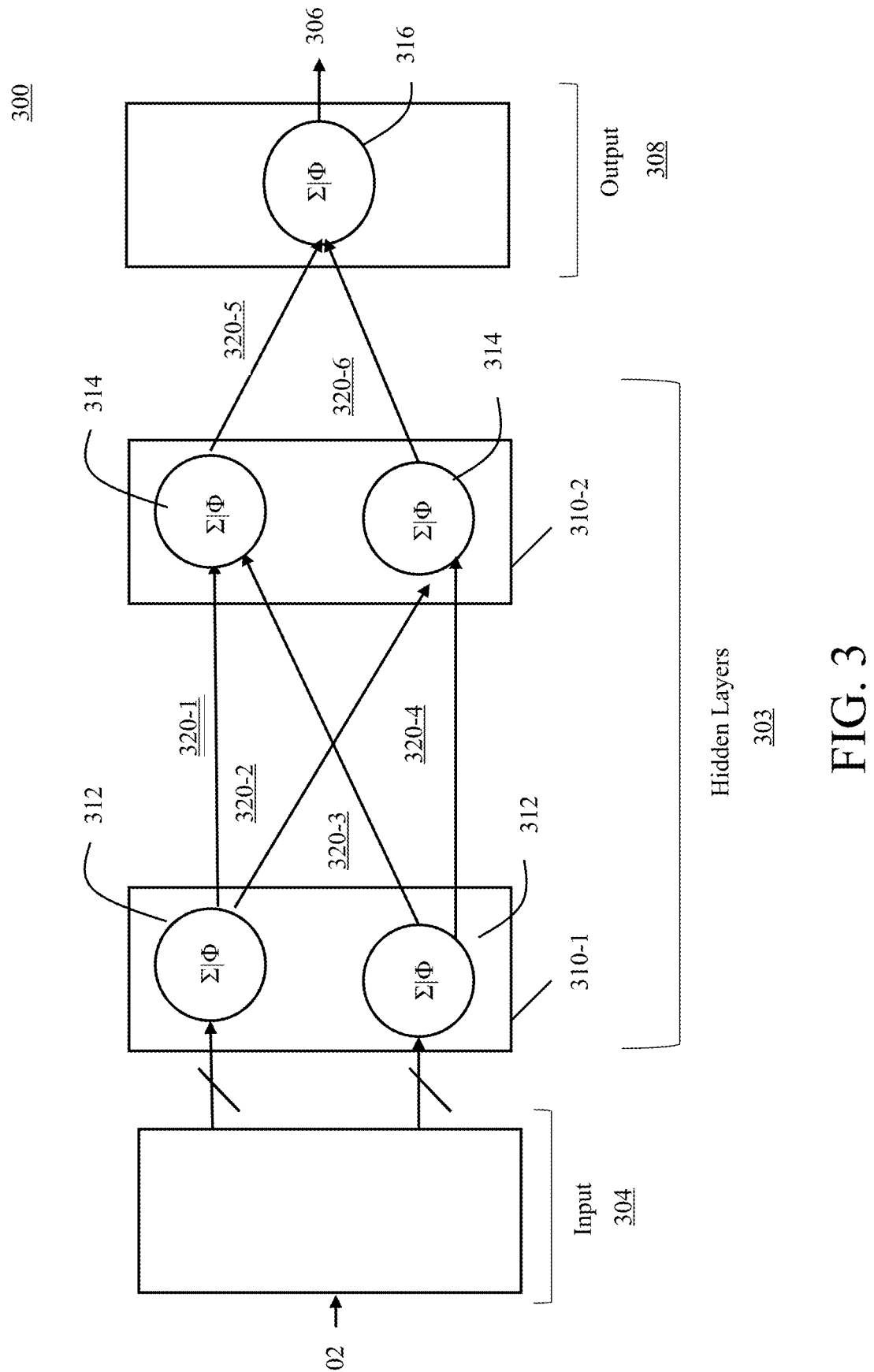
FIG. 3 depicts a block diagram of an AI model of the AI sub-system of FIG. 2, according to an example embodiment.

Referring to FIG. 3, a block diagram of a simplified neural network model 300 is shown. The neural network model 300 may include a stack of distinct layers (vertically oriented) that transform a variable number of inputs 302 being ingested by an input layer 304, into an output 306 at the output layer 308.

The neural network model 300 may include a number of hidden layers 310 between the input layer 304 and output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sum up the values from adjacent nodes and apply an activation function, allowing the neural network model 300 to detect nonlinear patterns in the inputs 302. Each of the nodes (312, 314 and 316) are interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306. Should a user of the system 100 desire a different output, the user can adjust one or more weights to adjust the strength of particular nodes.

In some embodiments, the output 306 may be one or more numbers. For example, output 306 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

With an example structure of system 100 being described above, example processes performable by the system 100 (or components/systems thereof) are described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Referring now to FIG. 4, a flow diagram of a method 400 for generating improved graphical user interfaces displaying account information is shown, according to an example embodiment. In some embodiments, the method 400 is performed or otherwise executed using various components of the system 100.

As shown, the method 400 begins when the provider computing system 102 establishes a connection (e.g., over the network 101) between the provider computing system 102 and the user device 104, at step 402. In some embodiments, the provider computing system 102 may be configured to establish the connection after identifying that a user of the user device 104 has initiated a session via the client application 124 (e.g., a user launches the client application 124). Alternatively or additionally, the provider computing system 102 may be configured to establish the connection after identifying that a user of the user device 104 has downloaded/installed the client application 124 on the user device 104 (e.g., the user downloads software associated with the client application 124 on a computer/mobile device). In this embodiment, the provider computing system 102 may maintain the connection with the user device 104 even if the user of the user device 104 does not launch the client application 124.

Upon establishing the wireless connection between the provider computing system 102 and the user device 104, at step 402, the provider computing system 102 authenticates a user of the user device, at step 404. The user may be configured to access one or more services offered by the provider computing system 102. For example, the user may be associated with one or more accounts held by the provider computing system 102. In some embodiments, the provider computing system 102 may be configured to transmit a prompt for authentication of a user of the user device 104 to the user device 104. For example, the processing circuit 116 may generate a passcode, a username and password combination, a quick access (QR) code, a token, or other suitable authentication credentials specific to the user and/or an account associated with the user. In some embodiments, the prompt for authentication may include at least one of a push notification, a text message, and email notification, etc. In some embodiments, the provider computing system 102 may transmit the prompt in response to identifying that the user has launched the client application 124.

Alternatively or additionally, the provider computing system 102 may be configured to retrievably store (e.g., in the memory 117) authentication credentials associated with a user device 104 such that a user of the user device 104 is not require to submit authentication credentials with each instance of launching the client application 124. For example, the provider computing system 102 may associate device information (e.g., a device identifier) of a user device 104 with an authenticated user. That is, a user may be authenticated to access the client application 124 once the user successfully accesses the user device 104 (e.g., logs in, etc.). In some embodiments, the provider computing system 102 may identify and store the device information when the client application 124 is installed/downloaded on the user device 104.

Upon authenticating the user, at step 404, the provider computing system 102 may be configured to identify one or more accounts associated with the authenticated user, at step 406. The one or more accounts associated with the authenticated user may include an account held by the provider computing system 102 (e.g., stored in the account database of the memory 117). For example, the account may include any of a demand deposit account, a credit card account, a receivable account, and so on. In some embodiments, the authenticated user may be associated with (e.g., employed by) an entity (e.g., an organization, an institution, a firm, a company, etc.) having one or more accounts held by the provider computing system 102. The user may be authorized to access/manage the one or more accounts of the entity. Therefore, after determining that the user is associated with the entity, the provider computing system 102 may be configured to identify the one or more accounts of the entity at step 406.

In some embodiments, the one or more accounts identi-fied by the provider computing system 102 at step 406 may include one or more user-designated accounts. The one or more user-designated accounts may refer to accounts (e.g., held by the provider computing system 102 and/or by the third-party provider(s) 106) that the authenticated user has designated as favorite accounts, preferred accounts, and so on. For example, the client application 124 may be config-ured to allow the user to indicate one or more accounts as a "favorite" by engaging with a selectable element (e.g., a button, an icon, etc.) associated with the account. The provider computing system 102 may store (e.g., in the accounts database of the memory 117) the one or more user-designated accounts such that the one or more accounts identified during step 406 include the one or more user-designated accounts.

In some embodiments, the provider computing system 102 may be configured to receive one or more user-defined classifications relating to each of the one or more accounts and may identify the one or more accounts based on the one or more user-defined classifications. The one or more user-defined classifications may include an account type, a fre-quency of account activity, or a threshold account balance. The user may define one or more of the user-defined classifications such that the provider computing system 102 is configured to identify the one or more accounts only if the one or more accounts complies with the user-defined clas-sifications. In this way, the provider computing system 102 may be configured to identify accounts that are relevant to a user, rather than accounts that a user is not interested in monitoring (e.g., accounts that are irrelevant to a user's role, inactive accounts, accounts with low-risk activity, etc.). For example, a user may define a threshold account balance as $10,000 such that the provider computing system 102 is configured to identify accounts with an account balance of at least $10,000. As another example, the user may define a frequency of account activity as daily such that the provider computing system 102 is configured to identify accounts with daily account activity. In this way, the provider com-puting system 102 may not identify inactive accounts.

In some embodiments, the provider computing system 102 may be configured to identify the one or more accounts via at least one API (e.g., the API 130). The one or more accounts identified via the at least one API may include one or more accounts held by the third-party provider(s) 106. For example, the one or more accounts held by the third-party provider(s) 106 may include a retirement account, a trust fund, a mutual fund, an index fund, a foreign currency account, a credit account, or any other type of account/fund accessible by the provider computing system 102 and main-tained by an institution that is a third-party relative to the provider institution associated with the provider computing system 102.

In some embodiments, the one or more accounts associ-ated with the authenticated user may include one or more domestic accounts and one or more foreign accounts. For example, the provider computing system 102 may be con-figured to identify one or more domestic accounts via a first API associated with a first institution (e.g., one or more domestic banks). The provider computing system 102 may be further configured to identify one or more foreign accounts via a second API associated with a second insti-tution (e.g., one or more foreign banks).

Upon identifying the one or more accounts associated with the authenticated user, at step 406, the provider com-puting system 102 may be configured to retrieve account information relating to the identified one or more accounts, at step 408. In some embodiments, the account information may be stored in the accounts database of the memory 117 and/or in the account database 136 of the third-party pro-vider(s). The account information refers to at least one of an account balance, a scheduled transaction, or a predicted transaction for each of the one or more accounts. The account balance refers to a real-time amount of funds available in each of the one or more accounts. The account balance fluctuates in real-time responsive to transactions relating to the account (e.g., a deposit of funds may increase the account balance, a withdrawal of funds may decrease the account balance, etc.). The scheduled transaction associated with the one or more accounts refers to a transaction (e.g., a deposit, a withdrawal, etc.) involving the one or more accounts that is scheduled to occur at a specific time. In some embodiments, the schedule transaction may include a transaction that occurs at a regular frequency (e.g., once per day, every two weeks, twice a month, every month, every other month, and so on). The scheduled transaction may include an upcoming transaction (e.g., the transaction has yet to occur) and/or a previous transaction (e.g., the trans-action has already occurred).

In some embodiments, retrieving the account information at step 408 may further include training an AI model (e.g., the AI model 204) at step 409. The AI model 204 may be trained based on a training dataset (e.g., training inputs 202, actual outputs 210, as described above with reference to FIG. 2). For example, the training dataset may include at least one of a transaction history associated with the one or more accounts associated with the authenticated user, a transaction history associated with one or more accounts associated with other users, contextual information associ-ated with the one or more accounts associated with the authenticated user, or third-party data. The AI model 204 may be trained to generate a predicted transaction associated with the one or more accounts identified at step 408. The predicted transaction may refer to a transaction associated with the one or more accounts that the provider computing system 102 (e.g., using the AI model 204) recommends based on the training dataset used to train the AI model 204, as described herein. For example, the provider computing system 102 may recommend the predicted transaction based on a resemblance between the predicted transaction and a transaction history of the user, a resemblance between the predicted transaction and a transaction history of other users, an advantage (e.g., a financial gain, a mitigation of risk, etc.) associated with the predicted transaction, and so on.

The AI model 204 may be further trained to identify abnormal activity represented by the account information. The abnormal activity refers to one or more anomalies, fraud indicators, errors, and the like detected in the account information. In some embodiments, the abnormal activity may be indicated by a scheduled transaction included in the account information. That is, the abnormal activity may be identified from at least one of a location, a currency, a transaction amount, a transaction method, a receiving party, and so on, associated with the scheduled transaction. For example, a scheduled transaction may require a $10,000 transfer to Company B. The AI model 204, however, may be configured to identify, from the transaction history of the user and of one or more other users having an account at the provider institution, that no transfer to Company B involves a transaction amount exceeding $1,000. Therefore, the AI model 204 may be configured to identify the scheduled transaction as abnormal activity. As another example, a scheduled transaction may involve a transfer of $1,000 to John Msith. In this example, the AI model 204 may be configured to identify that the transaction history includes a plurality of transactions associated with John Smith, but no transactions with John Msith. Therefore, the AI model 204 may be configured to identify the scheduled transaction as abnormal activity. The AI model 204 may also be configured to identify scheduled transactions as exceeding a fraud check threshold, where the fraud check threshold is based on characteristics of the scheduled transaction (e.g., amount, payee, payee country, receiving financial institution, receiving financial institution country, frequency of transactions to payee, cumulative amount of transactions to payee or payee and other payees related to the payee, etc.) that are indicative of fraudulent activity.

In some embodiments, the AI model 204 may be trained to detect the abnormal activity based on a deviation of the account information the information included in the training dataset. For example, a transaction history associated with the one or more accounts identified at step 406 may reveal that a transaction amount corresponding to each transaction included in the transaction history does not exceed a threshold amount (e.g., $1,000). The AI model 204 may be trained (e.g., using the threshold amount included in the training dataset) to detect a scheduled transaction with a transaction amount exceeding the threshold amount (e.g., $10,000) as a deviation of the account information from the information included in the training dataset. As another example, the training dataset may include third-party data (e.g., a news article) indicating that a company is at risk of bankruptcy. Based on this information, the AI model 204 may be trained to flag/mark a scheduled transaction involving an investment in that company as abnormal activity based on the training data. Training the AI model 204 to identify abnormal activity alerts users associated with the one or more accounts of potential fraud, errors, or other risks associated with a scheduled transaction. The provider computing system 102 may identify the scheduled transaction as abnormal activity via a graphical user interface presented to the user via the user device 104 (e.g., GUI 500a, as described below with reference to FIG. 5A).

Accordingly, in some instances, the account information (e.g., represented by selectable elements 515a, 515b, and 515c, as described below with reference to FIGS. 5A-5C) may be arranged such that the scheduled transaction including the abnormal activity is displayed more prominently than the scheduled and/or predicted transaction. For example, in some instances, the abnormal activity may be bolded, underlined, enlarged, or moved to a left-most and/or uppermost location (e.g., the first listed transaction) of the account information. In some instances, upon the AI model 204 determining that the abnormal activity has been addressed, the provider computing system 102 is configured to modify or update the graphical user interface (e.g., GUI 500a) to rearrange or redesign the account information such that a new transaction (e.g., a predicted transaction, a scheduled transaction) is prominently displayed instead of the abnormal activity. For example, the new transaction may include a transaction involving a transaction amount exceeding a threshold, an impending date and/or time of execution, and so on.

Upon retrieving the account information, at step 408, and, according to some embodiments, training the AI model 204, at step 409, the provider computing system 102 may be configured to monitor the retrieved account information, at step 410. The provider computing system 102 may monitor the retrieved account information for real-time updates to the account balance, the scheduled transaction, and/or the predicted transaction associated with the one or more accounts. For example, the real-time updates to the account balance may include changes in an amount of funds available in the corresponding account after one or more transactions relating to the account have been processed. The real-time changes in the scheduled transaction may include a change in a status associated with the scheduled transaction (e.g., pending, upcoming, processed, awaiting approval, etc.). The real-time changes in the predicted transaction a change in the status associated with the predicted transaction (e.g., pending, upcoming, processed, awaiting approval, etc.). In some embodiments, the AI model 204 may be configured to modify the predicted transaction as the AI model 204 learns over time and/or based on updates to the training dataset. For example, the AI model 204 may delete/cancel/remove a predicted transaction that was previously beneficial to the user but that, based on updated training data (e.g., a news report), may now pose one or more risks and/or disadvantages.

The provider computing system 102 may be configured to, concurrent with and/or following the monitoring of the retrieved account information, at step 410, cause a user interface to be displayed on the user device 104 (e.g., via the client application 124) associated with the user, at step 412. The user interface may be a graphical user interface (GUI) (e.g., GUI 500a, 500b, or 500c, as described below) displayed on the user device 104. In some embodiments, the user interface may be displayed as an overlay on the user device. Furthermore, the user interface may be displayed as a repositionable overlay on the user device. The user interface may include one or more selectable elements (e.g., 515a, 515b, and 515c, as described below with reference to FIGS. 5A-5C) indictive of at least one of the account balance, the scheduled transaction, or the predicted transaction. For example, the selectable elements may be text listed on a scrolling display. That is, a list of each of the account balance, the scheduled transaction, or the predicted transaction associated with a particular account may be configured to scroll across a screen of the user device 104 (e.g., a "ticker").

In some embodiments, the provider computing system 102 include the one or more selectable elements based on one or more parameters associated with the scheduled transaction and/or the predicted transaction. The one or more parameters may include a time period, a transaction type, a transaction amount, or one or more parties associated with a scheduled transaction and/or a predicted transaction. In some embodiments, the user and/or the provider institution may pre-define the one or more parameters associated with account information that the user interface may include. For example, the user and/or the provider institution may define a time period as a two-hour period (e.g., two hours from a current time at which the user is viewing the user interface) such that a transaction (e.g., a scheduled transaction or a predicted transaction) that is scheduled to occur outside of the two-hour period (e.g., five hours from a current time when the user is viewing the user interface) may not be included among the selectable elements on the user interface until the transaction is scheduled to occur within the two-hour period.

The user interface may further include one or more of the real-time updates. That is, as the provider computing system 102 identifies a change in at least one of the account balance, the scheduled transaction, or the predicted transaction, the provider computing system 102 may be configured to update the user interface such that the one or more selectable elements reflect the updated account balance, scheduled transaction, and/or predicted transaction. Because the account information is monitored in real-time and concurrent with the user interface being displayed on the user device, the user interface is configured to display updated information automatically without requiring a user to refresh a webpage, submit additional authentication credentials, initiate a new session via the client application 124, etc.

Each of the selectable elements included on the user interface may be configured to cause, when selected, the user interface to display additional information relating to an account of the one or more accounts associated with the selectable element. Therefore, the provider computing system 102 may receive a selection of a selectable element on the user interface at step 414. In some embodiments, a user may select the selectable element by clicking on the selectable element. The user may click on a hyperlinked text that displays the account balance of one of the one or more accounts.

Upon receiving the selection of the selectable element at step 414, the provider computing system 102 may be configured to display additional information relating to an account associated with the selected selectable element. For example, if the user selects hyperlinked text that displays an account balance of "Account 1," the provider computing system 102 may be configured to display additional information relating to "Account 1." The additional information may include an account number, the account balance, a transaction history associated with the account, one or more upcoming transactions associated with the account, and so on, as described in greater detail below. In some embodiments, the additional information may be displayed via a portion of the user interface including the selectable elements (e.g., GUI 600*a*). In some embodiments, the additional information may be displayed via a second user interface that is a separate user interface from the user interface including the selectable elements (e.g., GUI 600*b*).

As an example operation of method 400, a user associated with a user device 104 may be a controller at a company. The company may be associated with a checking account at a first financial institution (e.g., the provider institution) and an investment fund at a second financial institution (e.g., a third-party provider). The controller may access a company computer (e.g., the user device 104) equipped with an application (e.g., client application 124) operated by the first financial institution. In this example, the first financial institution may have established a connection between the first financial institution's computing system (e.g., the provider computing system 102) and the company computer when the application was installed on the company computer. Additionally, the first financial institution may authenticate the controller as having access to one or more services provided by the first financial institution as soon as the controller accesses the company computer (e.g., after a successful log-in of the controller into the company computer).

After authenticating the controller, the first financial institution may identify the checking account associated with the company (e.g., stored in the accounts database of the memory 117) and the investment fund (e.g., stored in the account database 136 and retrieved via the API 130). The first financial institution may also retrieve an account balance, a scheduled transaction, and a predicted transaction associated with each of the checking account and the investment fund. The first financial institution may display the account balance, the scheduled transaction, and the predicted transaction on banner that extends across a home screen on the company computer. On the back end, the first financial institution monitors the account balance, the scheduled transaction, and the predicted transaction associated with each of the checking account and the investment fund. The first financial institution may identify that a $500 deposit into the investment fund has been processed by the second financial institution. Therefore, the first financial institution may update the display on the controller's home screen to reflect the account balance after receiving the $500 deposit. The $500 deposit may be listed on the home screen as a scheduled transaction associated with the investment fund and may be represented by a hyperlinked text (e.g., a selectable element).

The controller may click on the hyperlinked text representing the $500 deposit to view additional information relating to the investment fund. After the controller clicks on the $500 deposit, the first financial institution may cause a pop-up window to be displayed on the screen of the company computer. In some embodiments, the pop-up window may be generated automatically upon interaction with the selectable element. Alternatively or additionally, the pop-up window may be generated in response to a user input. For example, the user input may include one or more settings, preferences, conditions, and so on, configured by the user and stored in association with the user account. The pop-up window may include the additional information relating to the investment fund (e.g., the account number, the date when the account was opened, a transaction history associated with the account, upcoming transactions associated with the account, etc.). Therefore, the controller is able to view the most relevant information (e.g., balances and transactions) relating to multiple accounts that the controller manages (e.g., the checking account and the investment fund) from a single screen. As another advantage, the controller may view additional information relating to each of the multiple accounts without having to submit additional authentication credentials and navigate through additional user interfaces.

Figure 5A:
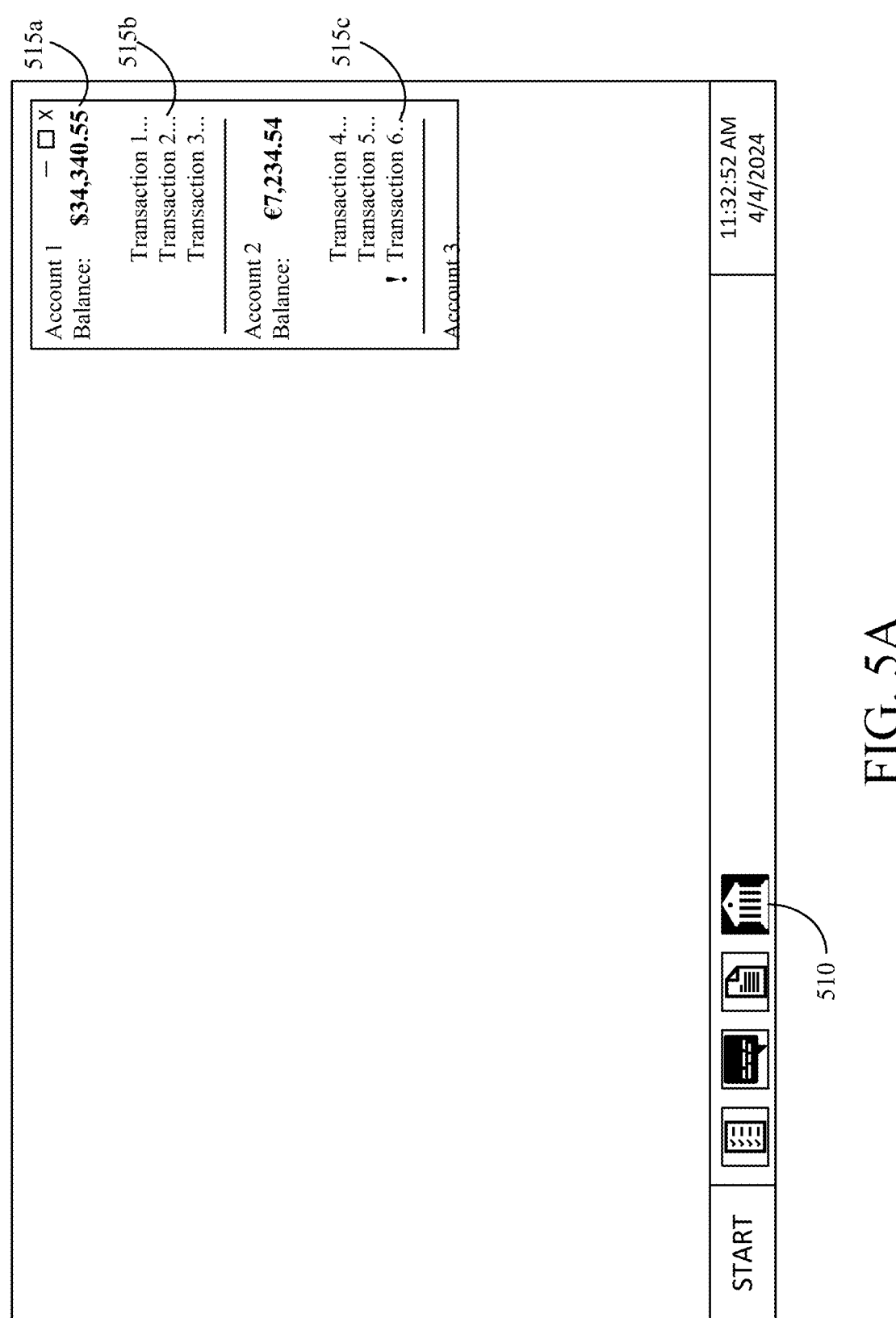
FIGS. 5A-5C depict GUIs configured to display account information, according to example embodiments.
Figure 5B:
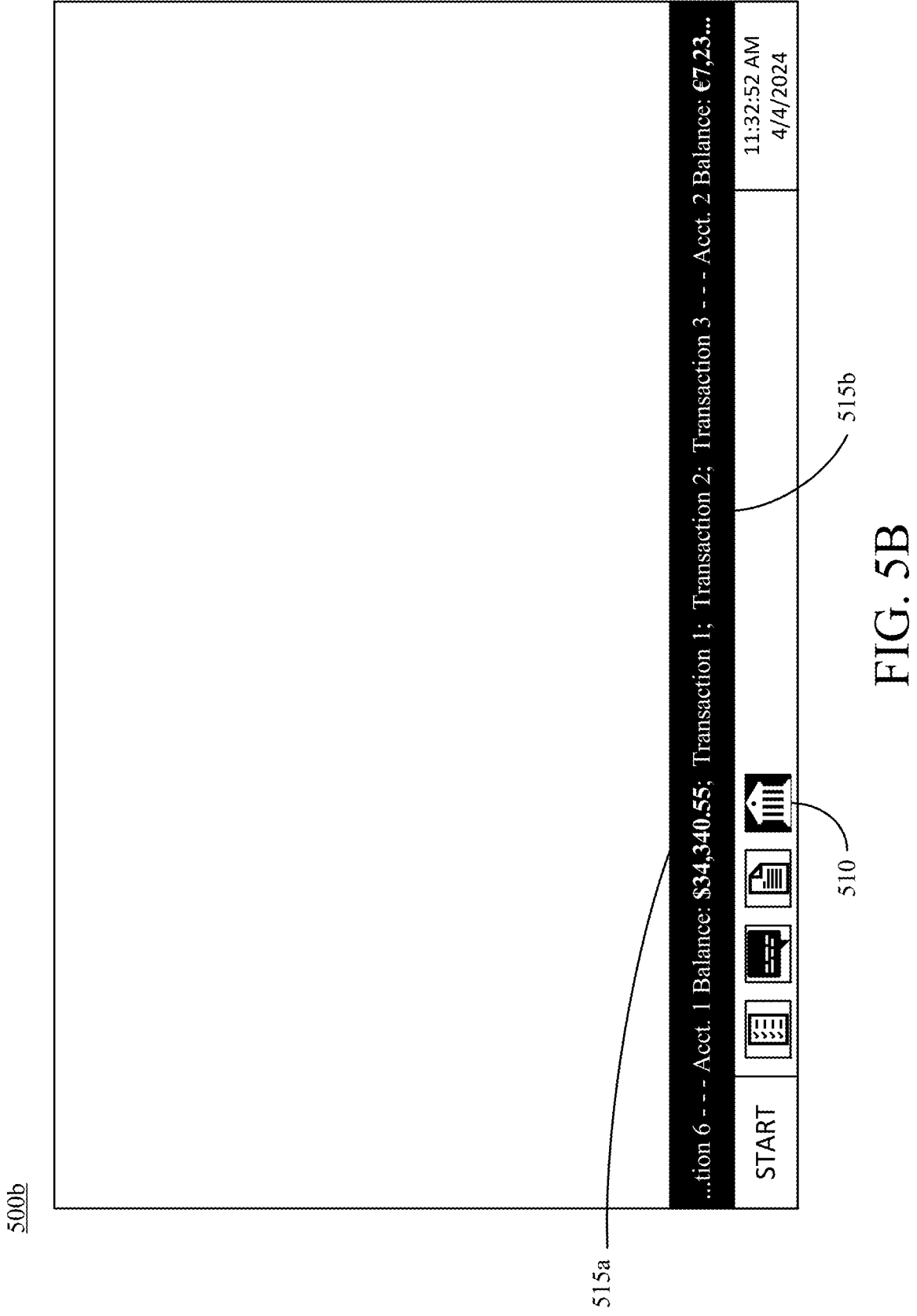
Figure 5C:
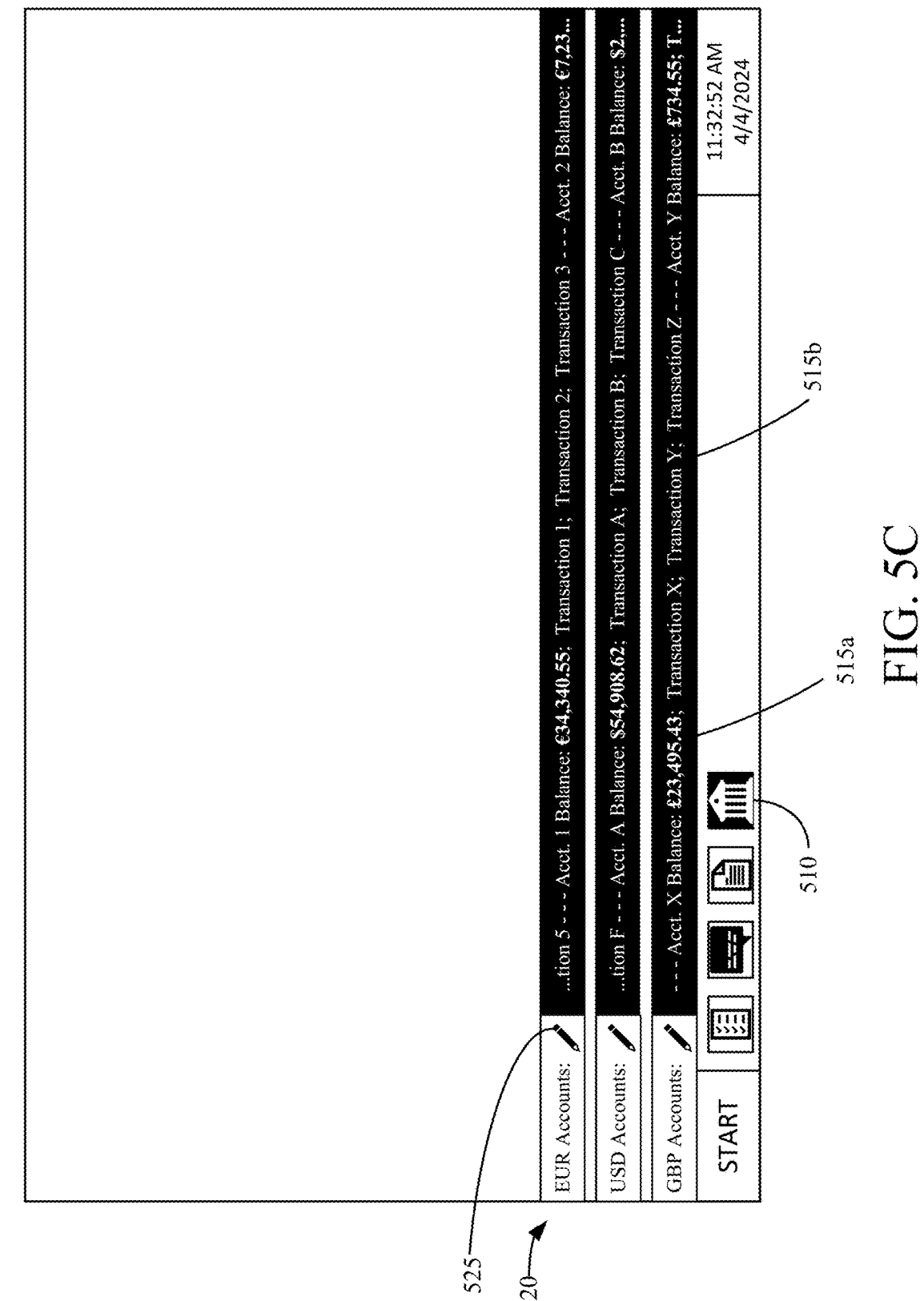

Referring to FIGS. 5A-5C, GUIs 500*a*, 500*b*, and 500*c* are shown for displaying account information via an improved graphical user interface, according to example embodiments. In some embodiments, the GUIs 500*a*, 500*b*, and 500*c* are generated by the provider computing system 102 and are provided to the user device 104 via the client application 124. The GUIs 500*a*, 500*b*, and 500*c* may include selectable element 510. In some embodiments, the selectable element 510 may be an icon representing the client application 124. For example, when a user clicks on the selectable element 510, the provider computing system 102 may be configured to initiate method 400 for displaying account information, as described above.

FIGS. 5A-5C are shown to include selectable elements 515*a*, 515*b*, and 515*c*. The selectable elements 515*a*, 515*b*, and 515*c* may represent the account information retrieved during step 408 of method 400, as described above. As shown in FIGS. 5A-5C, selectable element 515*a* may represent an account balance associated with an account. Selectable element 515*b* may represent a transaction (a scheduled transaction or a predicted transaction) associated with an account. As shown in FIG. 5A, selectable element 515*c* may represent a transaction that the provider computing system 102 identifies as abnormal activity. For example, the selectable element 515*c* includes an exclamation mark indicating the identification of abnormal activity.

Referring to FIG. 5A, the GUI 500*a*, as shown, may include a static display of the account information in an area of the GUI 500*a*. For example, the area of the GUI 500*a* is depicted as an upper corner of the GUI 500*b*. A user of the user device 104 may engage with (e.g., scroll) the static display in order to view all of the account information retrieved by the provider computing system 102 during step 408 of method 400. Alternatively, referring to FIG. 5B, the GUI 500*b* is shown to include a dynamic (e.g., scrolling, ticking, etc.) display of the account information in an area of the GUI 500*b*. For example, the area of the GUI 500*b* is depicted as a bottom edge of the GUI 500*b*. The dynamic display of the account information may cause the account information retrieved by the provider computing system 102 during step 408 of method 400 to continuously scroll across the area of the GUI 500*b*.

Referring to FIG. 5C, the GUI 500*c* may include a user-defined classification 520. For example, the user-defined classification may include an account type. As shown in FIG. 5C, the GUI 500*c* includes three account types (e.g., accounts in the Euro, accounts in the United States Dollar, and accounts in the Pound sterling). For each of the three account types, the GUI 500*c* may include a separate display of account information relating to accounts corresponding to each of the three account types. The GUI 500*c* is further shown to include selectable element 525 (e.g., depicted as a pencil icon). The selectable element 525 may allow a user of the user device 104 to change/update/modify the account information displayed via the GUI 500*c*. That is, by clicking on the selectable element 525, the user may instruct the provider computing system 102 to display account information according to one or more parameters. For example, the user may engage with the selectable element 525 such that the account information only reflects transactions associated with each of the accounts that exceed a threshold amount (e.g., $200).

Figure 6A:
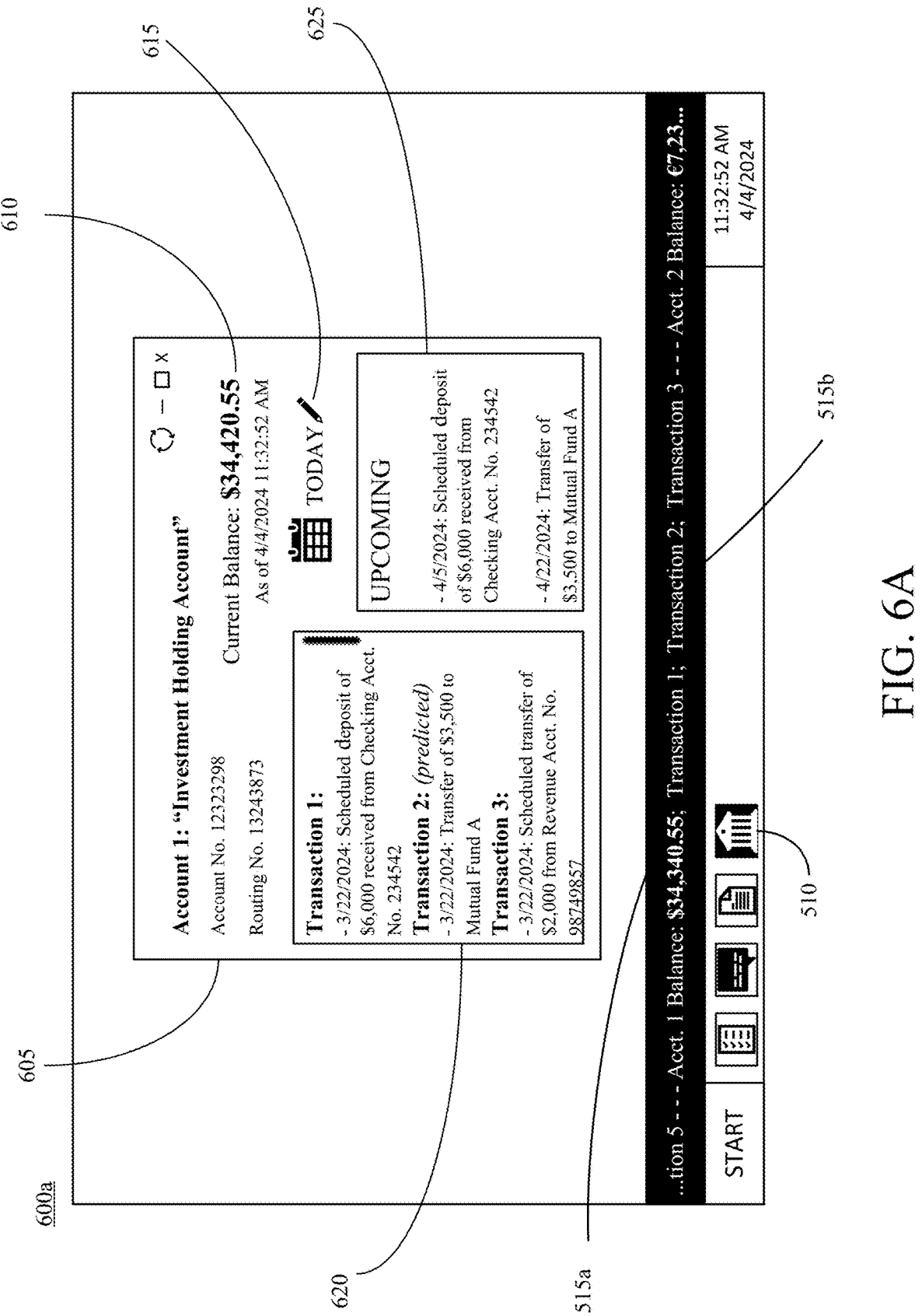
FIGS. 6A-6B depict GUIs configured to display additional account information, according to example embodiments.
Figure 6B:
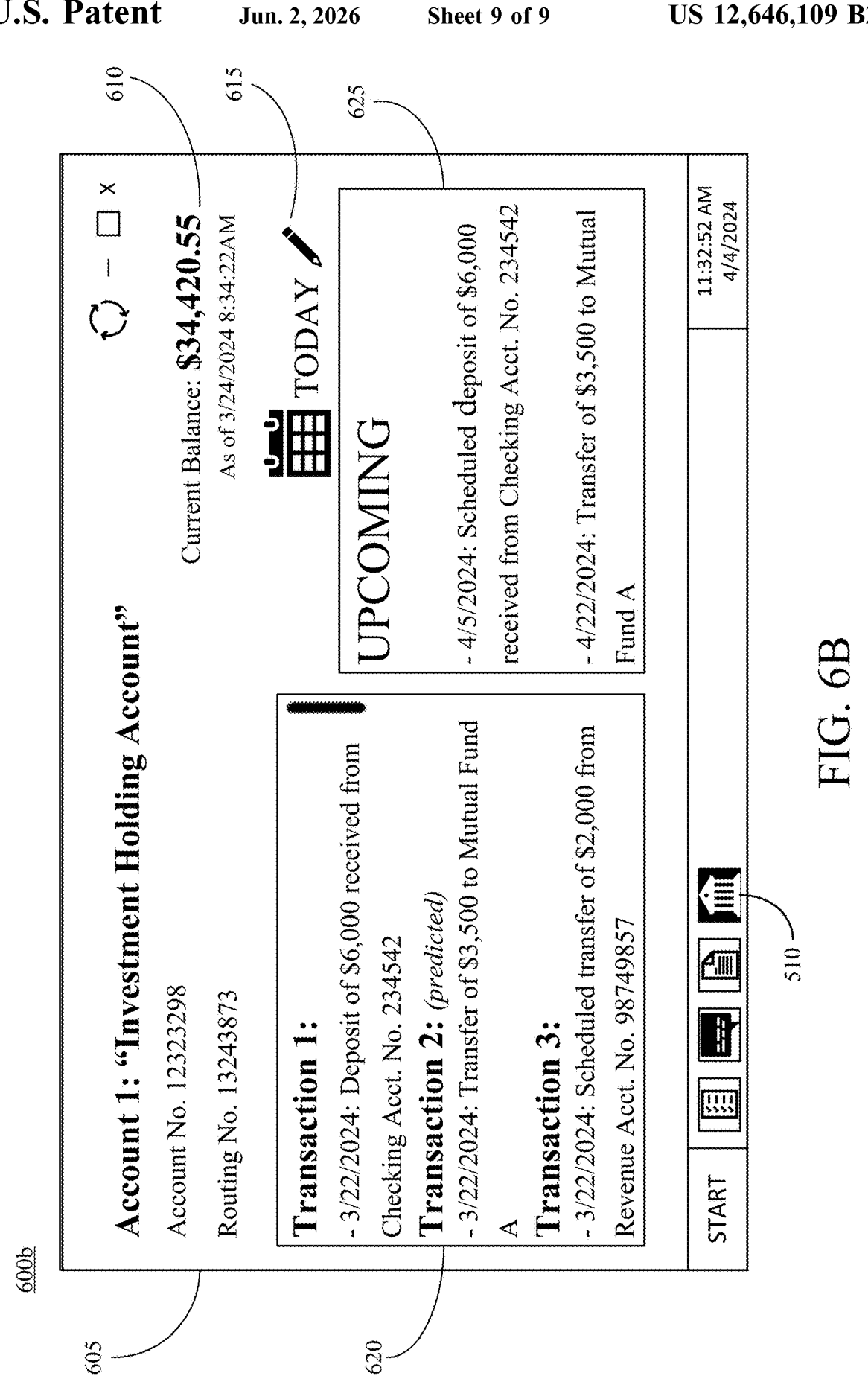

Referring to FIGS. 6A and 6B, GUIs 600*a* and 600*b* are shown for displaying additional information (e.g., the additional information displayed during step 416 of method 400) related to each of the accounts included on GUIs 500*a*, 500*b*, and 500*c*. In some embodiments, GUIs 600*a* and/or 600*b* may be displayed in response to a user engaging with at least one of the selectable elements 515*a*, 515*b*, or 515*c*. As shown in FIGS. 6A and 6B, the GUIs 600*a* and 600*b* may include Referring to FIG. 6A, the additional information may be displayed on a portion of the GUI 600*a* such that the GUI 600*a* includes the account information of GUIs 500*a*, 500*b*, and 500*c*. That is, the display of the additional information comprises the portion of the GUI 600*a* such that the user of the user device 104 may continue to view and engage with selectable elements 515*a* and 515*b*, as shown. Alternatively, referring to FIG. 6B, the additional information may be displayed a second user interface (e.g., GUI 600*b*) such that the GUI 600*b* does not include the account information of GUIs 500*a*, 500*b*, and 500*c*. In other words, the provider computing system 102 may be configured to display the additional information via a pop-up window (e.g., GUI 600*a*, as shown in FIG. 6A) or via a new window (e.g., GUI 600*b*, as shown in FIG. 6B).

In some embodiments, the GUIs 600*a* and 600*b* may include account data 605, an account balance 610, a time frame 615, transactions 620, and upcoming transactions 625. As shown, the account data 605 may include an account name (e.g., "Investment Holding Account"), an account number, and/or a routing number corresponding to the account associated with the selected selectable element (e.g., selectable element 515*a* and/or 515*b*). The account balance 610 refers to a real-time balance associated with the account. In some embodiments, the provider computing system 102 may be configured to update the GUIs 600*a*/600*b* to reflect changes (e.g., deposits and/or withdrawals) to the account balance 610. The time frame 615 refers to a period of time over which the transactions 620 relate. For example, the user may select the time frame 615 to be "Today" such that the transactions 620 included in the additional account information displayed via GUIs 600*a*/600*b* are transactions scheduled and/or predicted to occur on the day when the user is accessing the client application 124. The transactions 620 refers to a list of predicted transactions and scheduled transactions associated with the account corresponding to the selected selectable element. For example, the transactions 620 may include a predicted transaction and a scheduled transaction included in the account information retrieved during step 408 of method 400. Alternatively or additionally, the transactions 620 may include a predicted transaction and a scheduled transaction that are not retrieved during step 408 during method 400 (e.g., a transaction that does not meet one or more parameters defined by the user and/or the provider institution, as described above). The upcoming transactions 625 refers to a listing of transactions associated with the account corresponding to the selected selectable element that may be scheduled and/or predicted to occur outside of the time frame 615.

In some instances, the elements and features shown within the GUIS 500*a*-500*c*, 600*a*-600*b* may be arranged within the corresponding graphical user interfaces based on their estimated relevance to the user. For example, in some instances, the provider computing system 102 is configured to estimate the most relevant and/or useful elements and features for inclusion within the corresponding GUIS 500*a*-500*c*, 600*a*-600*b* using one or more machine learning models (e.g., AI model 204) of the provider computing system 102. In some instances, the provider computing system 102 may train the one or more machine learning models to identify the most relevant and/or useful elements and features for inclusion using various training data. The training data may comprise historical utilization of similar features and elements by users, corresponding transaction selections by those users, and corresponding user information (e.g., income level, number of dependents, geographical location) associated with those users. In some instances, the training data may be data compiled over time from a variety of users associated with the provider and stored within a database associated with the provider computing system 102 (e.g., the memory 117).

Accordingly, once the one or more machine learning models have been trained, the provider computing system 102 may apply the transaction selections and various user information pertaining to the user to the one or more machine learning models to identify the most relevant and/or useful elements and features for inclusion on the corresponding graphical user interface (e.g., one of the GUIS 500*a*-500*c*, 600*a*-600*b*). The provider computing system 102 may further arrange the elements and features specifically according to their estimated relevance. For example, in some instances, the most relevant features (e.g., scheduled and/or predicted transactions) may be arranged in a top left corner of the screen. The features may then be arranged in descending order of relevance from left to right and top to bottom within the graphical user interface. In some instances, the provider computing system 102 is configured to utilize various feedback information (e.g., features and elements actually used by the user) received from the user (e.g., via the user device 104) to retrain or otherwise update the one or more machine learning models. Accordingly, in some instances, the provider computing system 102 may rearrange the elements and/or features on the graphical user interface based on the updated machine learning models and their associated outputs.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider computing system comprising:
a processing circuit having a processor coupled to a memory device, the memory device storing instructions thereon that, when executed by the processor, cause the processing circuit to perform operations comprising:
establishing a connection between the provider computing system and a user device associated with a user, wherein an application operated by the provider computing system is installed on the user device, and wherein the user device comprises a user interface;
identifying one or more accounts associated with the user;
retrieving account information for each of the one or more accounts, wherein the account information comprises at least one of an account balance, a scheduled transaction, or a predicted transaction;
monitoring the account information for real-time updates in the at least one of the account balance, the scheduled transaction, or the predicted transaction; and
causing a first portion of the user interface to display an overlay on the user device in response to the connection, the first portion comprising one or more selectable elements indicative of at least one of the account balance, the scheduled transaction, or the predicted transaction, and comprising one or more of the real-time updates, wherein each selectable element is configured to cause, when selected, a second portion of the user interface to display additional information relating to an account of the one or more accounts associated with the selectable element, wherein the first portion is configured to scroll across the user interface.

2. The provider computing system of claim 1, wherein the operations further comprise:

training, based on a training dataset, an artificial intelligence (AI) model; and
generating, using the trained AI model, the predicted transaction.

3. The provider computing system of claim 2, wherein the training dataset comprises at least one of a transaction history associated with the one or more accounts associated with the user, a transaction history associated with one or more accounts associated with other users, contextual information associated with the one or more accounts associated with the user, or third-party data.

4. The provider computing system of claim 2, wherein the AI model is further trained to identify abnormal activity represented by the account information, wherein the AI model detects the abnormal activity based on a deviation of the account information from information included in the training dataset.

5. The provider computing system of claim 1, wherein the user interface is configured to display the additional information on a portion of the user interface.

6. The provider computing system of claim 1, wherein the user interface is configured to display the additional information on a second user interface displayed via a pop-up window, wherein the pop-up window is generated at least one of automatically or in response to a user input.

7. The provider computing system of claim 1, wherein the account information is retrieved from at least one of a first application programming interface (API) or a second API, wherein the first API corresponds to a domestic bank and the second API corresponds to a foreign bank.

8. The provider computing system of claim 1, wherein the user interface comprises the one or more selectable elements based on one or more parameters, and wherein the one or more parameters comprises at least one of a time period, a transaction type, a transaction amount, or one or more parties associated with each of the scheduled transaction or the predicted transaction.

9. The provider computing system of claim 1, wherein the operations further comprise:
receiving one or more user-defined classifications relating to each of the one or more accounts;
wherein the one or more accounts are identified based on the one or more user-defined classifications.

10. A method comprising:
establishing, by a provider computing system, a connection between the provider computing system and a user device associated with a user, wherein an application operated by the provider computing system is installed on the user device, and wherein the user device comprises a user interface;
identifying, by the provider computing system, one or more accounts associated with the user;
retrieving, by the provider computing system, account information for each of the one or more accounts, wherein the account information comprises at least one of an account balance, a scheduled transaction, or a predicted transaction;
monitoring, by the provider computing system, the account information for real-time updates to the at least one of the account balance, the scheduled transaction, or the predicted transaction; and
causing, by the provider computing system, a first portion of the user interface to display an overlay on the user device in response to the connection, the first portion comprising one or more selectable elements indicative of at least one of the account balance, the scheduled transaction, or the predicted transaction, and comprising one or more of the real-time updates, wherein each selectable element is configured to cause, when selected, a second portion of the user interface to display additional information relating to an account of the one or more accounts associated with the selectable element, wherein the first portion is configured to scroll across the user interface.

11. The method of claim 10, the method further comprising:

training, by the provider computing system and based on a training dataset, an artificial intelligence (AI) model; and generating, by the provider computing system and using the trained AI model, the predicted transaction.

12. The method of claim 11, wherein the training dataset comprises at least one of a transaction history associated with the one or more accounts associated with the user, a transaction history associated with one or more accounts associated with other users, contextual information associated with the one or more accounts associated with the user, or third-party data.

13. The method of claim 11, wherein the AI model is further trained to identify abnormal activity represented by the account information, wherein the AI model detects the abnormal activity based on a deviation of the account information from information included in the training dataset.

14. The method of claim 10, wherein the user interface is configured to display the additional information on a portion of the user interface or on a second user interface displayed via a popup window, wherein the pop-up window is generated at least one of automatically or in response to a user input.

15. The method of claim 10, wherein the account information is retrieved from at least one of a first application programming interface (API) or a second API, wherein the first API corresponds to a domestic bank and the second API corresponds to a foreign bank.

16. The method of claim 10, wherein the user interface comprises the one or more selectable elements based on one or more parameters, and wherein the one or more parameters comprises at least one of a time period, a transaction type, a transaction amount, or one or more parties associated with each of the scheduled transaction or the predicted transaction.

17. The method of claim 10, the method further comprising:

receiving, by the provider computing system, one or more user-defined classifications relating to each of the one or more accounts;

wherein the one or more accounts are identified based on the one or more user-defined classifications.

18. The method of claim 10, wherein:

the one or more selectable elements comprises a plurality of selectable elements;

the scheduled transaction comprises abnormal activity; and a selectable element of the plurality selectable elements associated with the scheduled transaction is displayed more prominently on the first portion relative to other selectable elements of the plurality of selectable elements.

19. A non-transitory computer-readable medium storing instructions that, when executed by one or more processors of a processing circuit, cause the processing circuit to:

establish a connection between a provider computing system and a user device associated with a user, wherein an application operated by the provider computing system is installed on the user device, and wherein the user device comprises a user interface;

identify one or more accounts associated with the user;

retrieve account information for each of the one or more accounts, wherein the account information comprises at least one of an account balance, a scheduled transaction, or a predicted transaction;

monitor the account information for real-time updates to the at least one of the account balance, the scheduled transaction, or the predicted transaction; and cause a first portion of the user interface to display an overlay on the user device in response to the connection, the first portion comprising one or more selectable elements indicative of at least one of the account balance, the scheduled transaction, or the predicted transaction, and comprising one or more of the real-time updates, wherein each selectable element is configured to cause, when selected, a second portion of the user interface to display additional information relating to an account of the one or more accounts associated with the selectable element, wherein the first portion is configured to scroll across the user interface.

* * * * *